(No Model.)

W. A. NASON.
VEHICLE SEAT BACK.

No. 431,004. Patented June 24, 1890.

WITNESS
J. K. Newman
Albert Speiden

INVENTOR
W. A. Nason
PER
M. F. Chamblin & Co.

UNITED STATES PATENT OFFICE.

WILLIAM ALBERT NASON, OF PLEASANTVILLE, ASSIGNOR OF ONE-THIRD TO JOHN B. NASON, OF VENANGO COUNTY, PENNSYLVANIA.

VEHICLE-SEAT BACK.

SPECIFICATION forming part of Letters Patent No. 431,004, dated June 24, 1890.

Application filed April 2, 1890. Serial No. 346,309. (No model.)

*To all whom it may concern:*

Be it known that I, WILLIAM ALBERT NASON, a citizen of the United States, residing at Pleasantville, in the county of Venango and State of Pennsylvania, have invented certain new and useful Improvements in Backs for Road-Carts and other Vehicles; and I do hereby declare the following to be a full, clear, and exact description of the invention, such as will enable others skilled in the art to which it appertains to make and use the same.

My invention relates to a back for the seats of road-carts or other vehicles of any kind; and its object is to provide an elastic back for the seats of vehicles that is comfortable and will adjust itself to the back of the person riding in the vehicle and ease the back from any jar or jerk occasioned by the buggy passing quickly over uneven roads or breaks or emergencies. I attain said object by a certain construction and arrangement of parts fully described in this specification and illustrated in the accompanying drawings, in which—

Figure 1:
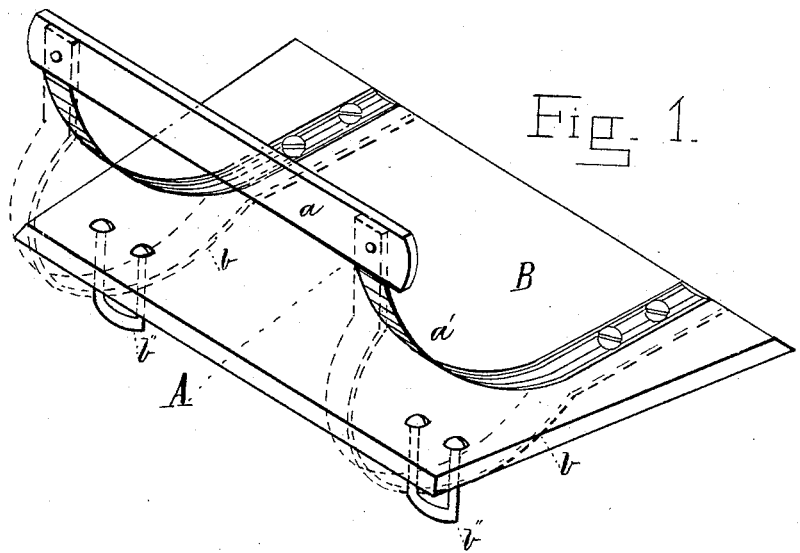
Figure 2:
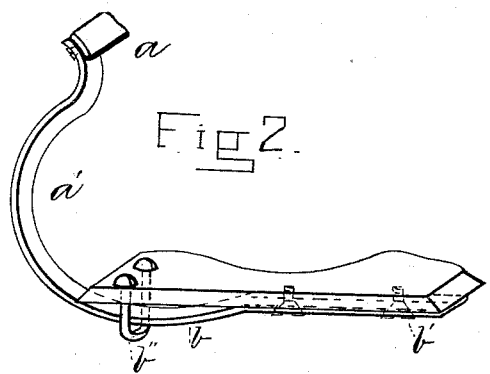

Figure 1 is a perspective view of my invention. Fig. 2 is a side view in elevation.

A designates the back, and it comprises the back-rail $a$ and the two curved elastic steel springs $a'$. Said springs are secured to the seat B and the horizontal portion $a$ in any suitable manner. (See Figs. 1 and 2, respectively.) I, however, attach special importance to the manner in which the springs are secured in Fig. 2. It will be observed that the front end $b'$, attached to the seat B, is flattened, and that the center and rear portion $b$ under the seat is curved, and in each of the rear sides of the seat, near the end, there is a staple-shaped iron $b''$, which has its upper ends secured in the seat and the lower portion of same extending downward below the springs, by means of which each of said springs is held in position, and at the same time allowed a free vertical movement, whereby the upper end of the spring to which the back-rail $a$ is attached is made susceptible of the slightest jar or jerk of the vehicle, and yields or adapts itself to the corresponding movement of the back of the driver. This feature of my invention has been demonstrated by practical test to be very valuable.

What I claim is—

1. In a lazy-back for vehicles, the curved springs passing through the staple or U-shaped irons underneath the seat, having their front ends secured to the front of the seat and their uppermost ends to the back-rail, in combination with the vehicle-seat and the back-rail, whereby said springs are securely held in position and allowed a free vertical movement, substantially as described.

2. In an easy-back for vehicles, the combination of the curved springs, the U-shaped irons secured underneath the seat, the back-rail of the vehicle to which the rear uppermost ends of said springs are secured, and the vehicle-seat, substantially as described, and for the purpose set forth.

In testimony whereof I affix my signature in presence of two witnesses.

WILLIAM ALBERT NASON.

Witnesses:
J. H. PENNELL,
JAMES DACK.